(12) United States Patent
Nakano et al.

(10) Patent No.: US 6,459,966 B2
(45) Date of Patent: Oct. 1, 2002

(54) NAVIGATING METHOD AND DEVICE FOR AN AUTONOMOUS VEHICLE

(75) Inventors: Yoshiyuki Nakano, Kanazawa; Yusuke Kihara, Tokyo, both of (JP)

(73) Assignee: Kanazawa Institute of Technology, Ishikawa ken (JP)

( * ) Notice: Subject to any disclaimer, the term of this patent is extended or adjusted under 35 U.S.C. 154(b) by 7 days.

(21) Appl. No.: 09/819,268

(22) Filed: Mar. 28, 2001

(30) Foreign Application Priority Data

Mar. 30, 2000 (JP) ........................................ 2000-136418

(51) Int. Cl.[7] .............................................. G06F 15/50
(52) U.S. Cl. ............................. 701/23; 701/24; 701/25; 701/26; 701/200; 180/167
(58) Field of Search ............................. 701/23, 24, 25, 701/26, 200, 202, 207, 210, 216; 180/167, 168

(56) References Cited

U.S. PATENT DOCUMENTS

| | | | |
|---|---|---|---|
| 4,818,855 A | | 4/1989 | Mongeon et al. ............ 235/440 |
| 5,111,401 A | * | 5/1992 | Everett, Jr. et al. ............ 701/24 |
| 5,281,901 A | * | 1/1994 | Yardley et al. ............. 318/587 |

OTHER PUBLICATIONS

Kawabata et al., "Autonomous Teleoperation of a Mobile Robot using Intelligent Data Carrier," T. IEE Japan, vol. 118–C, No. 11, 1998.

* cited by examiner

Primary Examiner—William A. Cuchlinski, Jr.
Assistant Examiner—Arthur D. Donnelly
(74) Attorney, Agent, or Firm—Brinks Hofer Gilson & Lione (57) ABSTRACT

The present invention relates to navigation of an autonomous vehicle capable of autonomously tracking a route toward a destination. The present invention provides a system comprising the steps of forming a route for an autonomous vehicle with a plurality of information storing elements placed at specific locations in line along a passageway, each beacon storing its own location information on the route, mounting an information retrieving section on the autonomous vehicle so that as the vehicle travels, the information retrieving section comes in sufficient proximity to the information storing elements in sequence, transmitting radio waves between the information retrieving section and information storing element, supplying, through the transmission of the radio wave, electricity from the vehicle to the information storing element to activate it, retrieving, by the information retrieving section, location information from the information storing element that indicates the vehicle's present position, and controlling a moving direction of the vehicle based on this vehicle's position information.

20 Claims, 3 Drawing Sheets

NAVIGATING METHOD AND DEVICE FOR AN AUTONOMOUS VEHICLE

BACKGROUND OF THE INVENTION

The present invention relates to a method for navigating an autonomous vehicle that enables the autonomous vehicle to track a route accurately along passageways to a predetermined destination and to travel autonomously along the route. The present invention also relates to a device for navigating an autonomous vehicle using the aforementioned navigating method, and an autonomous vehicle provided with the navigating device using the navigating method.

Needs for so-called autonomous vehicles have been recognized in various industrial fields. The autonomous vehicle includes a self-motored vehicle having a power source, guided by sensors, for autonomously delivering goods to designated locations along routes on indoor or outdoor passageways, and a mobile carriage as part of robotic systems. However, the following requirements must be satisfied to navigate such an autonomous vehicle:

(1) The vehicle should by itself be able to measure and recognize its current position;

(2) The vehicle should by itself be able to track a route accurately along passageways leading itself to a destination; and (3) The vehicle should by itself be able to autonomously guide itself along the found route.

Following conventional navigating methods are known for navigating autonomous vehicles:

(a) The vehicle is mounted with a camera, or an ultrasonic sensor, for visually observing and analyzing the surroundings of the vehicle and determines, based on the analysis result, a route to be followed that leads itself to a destination (the visual-image recognition method).

(b) Lines of light-reflecting tape are applied along passageways. The vehicle is mounted with a light-emitting device for lighting the light-reflecting tape and a light-detecting device for detecting the light reflection of the light-reflecting tape, thereby enabling the vehicle to track the light-reflecting tape. The light-reflecting tapes may be laid at intervals along passageways. As the vehicle travels, the vehicle counts, by a counter mounted on the vehicle, the number of tapes it has passed, and calculates the distance that the vehicle has traveled (the tape method).

(c) Cables generating an electromagnetic wave are laid continuously along passageways. An electromagnetic wave receiver is mounted on the vehicle for tracking the cables (the electromagnetic wave/cable method).

(d) Rail tracks are laid along passageways. The vehicle travels along the rail tracks (the rail-track method).

However, the visual-image recognition method has a problem that it requires a high-quality image processing device for analyzing complex backgrounds and contours of the vehicle's surroundings. The tape method has a different problem that the tapes may become undetectable over years of use because of quality changes the tapes sustain due, for instance, to accumulation of dirt. The electromagnetic wave/cable method would cost significantly for laying cables. The rail track method also costs heavily for laying rails, and moreover, the rail tracks likely become obstacles for other traffics.

On the other hand, another method, using an RFID (Radio Frequency Identification Device), has been known. The RFID is a device that uses electromagnetic short wave (SW) to be exchanged between an information storing element and an information retrieving section as they come in proximity to each other, thereby supplying electricity from the information retrieving section to the information storing element and activating it, which transfers information (such as location data) stored therein to the information retrieving section where the data is then recognized.

One example of the FRID method described above is disclosed in the Official Gazette of Laid-open Japanese Patent Application No. Sho 62-501671.

Figure 7:
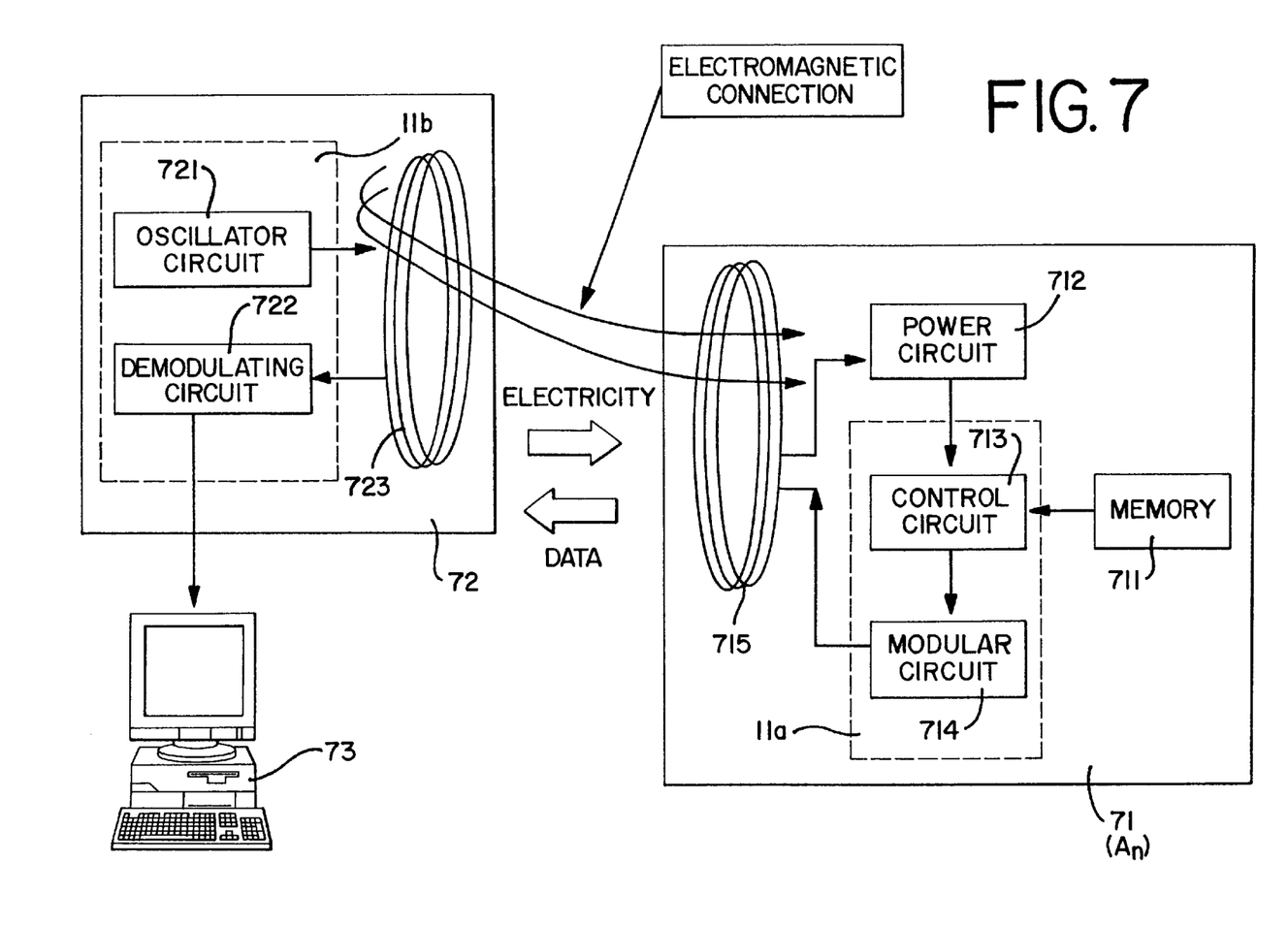
FIG. 7 is a diagram showing the structure of RFID circuits.

The structure of the RFID in this application is similar to the structure shown in a block circuit diagram of FIG. 7. In FIG. 7, a numeral 71 indicates an information storing element comprising a memory 711 storing a variety of information (for example, location data indicating its location along a route, which data is also required in the present invention), a power circuit 712, a control circuit 713, a modular circuit 714, an antenna coil (antenna) 715, etc. The section comprising the control circuit 713 and the modular circuit 714 may be regarded as a transmitting/receiving circuit 11a. A numeral 72 indicates an information retrieving section comprising an oscillator circuit 721, a demodulating circuit 722, an antenna coil (antenna) 723, etc. The section consisting of the oscillator circuit 721 and the demodulating circuit 722 may be regarded as another transmitting/receiving circuit 11b. Although the information storing element 71 and the information retrieving section 72 are illustrated in the drawing at a distance therebetween, their respective antenna coils 715 and 723 come in proximity to each other in use. A numeral 73 indicates an information processing unit (computer) for processing information (data) which the information retrieving section 72 retrieved from the memory 711.

In order for the information retrieving section 72 to become able to retrieve information stored in the memory 711 of the information storing element 71, electricity has to be supplied from the information retrieving section 72 to the information storing element 71. For this purpose, the antenna coils 715 and 723 are first brought sufficiently close to each other, and the oscillator circuit 721 of the information retrieving section 72 is activated to oscillate, thus transmitting high-frequency electric current to the antenna coil 723. The antenna coil 723, in response, generates SW toward the antenna coil 715 of the information storing element 71. As a result, the antenna coils 723 and 715 become electromagnetically connected, and thus the high-frequency electric current is induced through the antenna coil 715. After converted at the power circuit 712, the electric current is supplied to the information storing element 71 in the form of electricity. This electricity activates the control circuit 713 to retrieve information (for example, location data) stored in the memory 711. Such information is then converted (modulated) by the modulating circuit 714 into high frequency electric current representing the information and transmitted from the antenna coil 715 toward the antenna coil 723 in the form of radio wave. The radio wave received by the antenna coil 723 of the information retrieving section 72 is then demodulated by the demodulating circuit 722 into the original information (such as location data) retrieved from the memory 711. The demodulated information is then sent to the computer 73 where the retrieved information is compared with a group of information (indicating, for instance, locations of information storing elements along passageways) stored in advance in the computer, and processed so that the information from the memory 711 is recognized and used for creating control signals.

BRIEF SUMMARY OF THE INVENTION

The present invention relates to navigation of an autonomous vehicle and solves the problems of the aforementioned conventional navigating methods. It is an object of the present invention to reduce construction costs of navigation system facilities while providing long-term reliability to the navigating system.

It is another object of the present invention that when a vehicle is about to run off a route, it can detect such a status quickly and prevent the vehicle's deviation from the route, and that it can also prevent navigation errors due to interferences of navigation radio waves.

According to the present invention, an autonomous vehicle is navigated along a route, using the functional concepts of the Radio Frequency Identification Device (RFID). The navigating method of the present invention comprising the steps of:

providing a route for a vehicle, formed with a plurality of elements, which correspond to the information storing element 71 of the RFID, in line along passageways on which the vehicle travels, each of the information storing element having a memory 711 storing in advance its own location information on the route;

mounting a component, which corresponds to the information retrieving section 72 of the RFID, on the vehicle so that as the vehicle travels, the information retrieving section 72 will come sufficiently close to the plurality of information storing elements 71 in sequence;

transmitting radio waves between the information retrieving section 72 and an information storing element 71;

supplying, through transmission of the radio wave, electricity from the vehicle to the information storing element 71 placed along the route to activating the information storing element 71;

retrieving, by the information retrieving section 72 of the vehicle, the location information stored in the information storing element that indicates the present position of the vehicle; and controlling a moving direction of the vehicle based on the position information to guide the vehicle along the route to a destination.

Another form of preferred embodiments of the present invention is a navigating method for navigating an autonomous vehicle, the method comprising the steps of:

providing a beacon line formed with a plurality of route beacons placed in line along a passageway, each beacon comprising: a memory storing its own location information on the route of a vehicle; an antenna for transmitting and receiving radio waves; a power circuit for converting the radio wave received by the antenna and supplying it as electricity; and a transmitting/receiving circuit, including the antenna, for receiving the radio wave, retrieving, powered by the power circuit, the beacon location information from the memory and transmitting the beacon location information by the antenna in the form of radio wave, the beacons being placed at specific locations corresponding to their respective location information, on the vehicle having driving wheels and steering means for controlling its moving direction, mounting: a transmitting/receiving circuit, including an antenna for transmitting/receiving radio waves, for transmitting a radio wave toward the route beacon and for receiving a radio wave containing the location information thereof, thus obtaining the present position information of the vehicle therefrom; and a power source for operating the transmitting/receiving circuit, the driving wheels and the steering means for controlling a moving direction of the vehicle, providing the vehicle further with a computer, in which information indicating locations of the route beacons to a destination is stored in advance, for executing computation, including comparing the retrieved vehicle's position information with the information indicating locations of the route beacons;

controlling the steering means to control the moving direction based on a computation result;

supplying, through the transmission of the radio wave from the transmitting/receiving circuit of the vehicle, electricity from the vehicle to the beacons in sequence as the vehicle travels autonomously, thereby retrieving stored location information from the memory of the route beacon;

transmitting a radio wave containing the location information to the transmitting/receiving circuit of the vehicle in sequence;

receiving, by the transmitting/receiving circuit of the vehicle, the radio wave containing the location information and obtaining the vehicle's present position information therefrom;

executing computation, by the computer, including comparing the vehicle's present position information with the information indicating locations of the route beacons; and controlling a moving direction of the vehicle based on the computation result to track the line of the route beacons, thereby guiding the autonomous vehicle along the route to the destination.

A second preferred embodiment form of the present invention is a navigating device for navigating an autonomous vehicle, comprising:

a plurality of route beacons, each beacon having: a memory storing its own location information in reference to a route of the vehicle; an antenna for transmitting and receiving radio waves; a power circuit for converting the radio wave received by the antenna and supplying it as electricity; and a transmitting/receiving circuit, including an antenna, for receiving a radio wave, retrieving, powered by the power circuit, the beacon location information from the memory, and transmitting the beacon location information by the antenna in the form of radio wave, a route beacon line formed with the route beacons placed at specific locations corresponding to their respective location information;

a vehicle having driving wheels and steering means for controlling its moving direction;

a mobile transmitting/receiving circuit, including a radio wave transmitting/receiving antenna, for transmitting and receiving radio waves toward and from the route beacons and retrieving the beacon location information so as to obtain vehicle's present position information therefrom;

a power source for operating the mobile transmitting/receiving circuit, the driving wheels and the steering means; and a computer, in which information indicating locations of the route beacons to a destination is stored, for executing computation, including comparing the obtained vehicle's position information with the information indicating locations of the route beacons, thereby controlling a moving direction of the steering means, the navigating device for the autonomous vehicle wherein the mobile transmitting/receiving circuit and the power source are mounted thereon.

A third preferred embodiment form of the present invention is an autonomous vehicle having a navigating device comprising:

a mobile transmitting/receiving circuit for transmitting a radio wave toward a plurality of route beacons, each route beacon comprising: a memory storing location information indicating its own location on a passageway; an antenna for transmitting and receiving radio waves; a power circuit for converting the radio wave received by the antenna into electricity and supplying it as power; and a transmitting/receiving circuit for receiving a radio wave, retrieving, powered by the power circuit, the location information from the memory and transmitting it by the antenna in the form of radio wave, the mobile transmitting/receiving circuit for receiving the radio wave from the route beacon and obtaining the vehicle's present position information therefrom;

a power source required for operating the mobile transmitting/receiving circuit, driving wheels and steering means of the vehicle for controlling a moving direction of the vehicle; and a computer, in which information indicating locations of the route beacons on the passageway to a destination is stored, for executing computation, including comparing the vehicle's present position information with the information indicating locations of the route beacons, thereby controlling the steering means.

The foregoing and other objects, aspects and advantages will be better understood from the following detailed description of preferred embodiments of the invention with reference to the attached drawings.

DETAILED DESCRIPTION OF THE INVENTION

Figure 1:
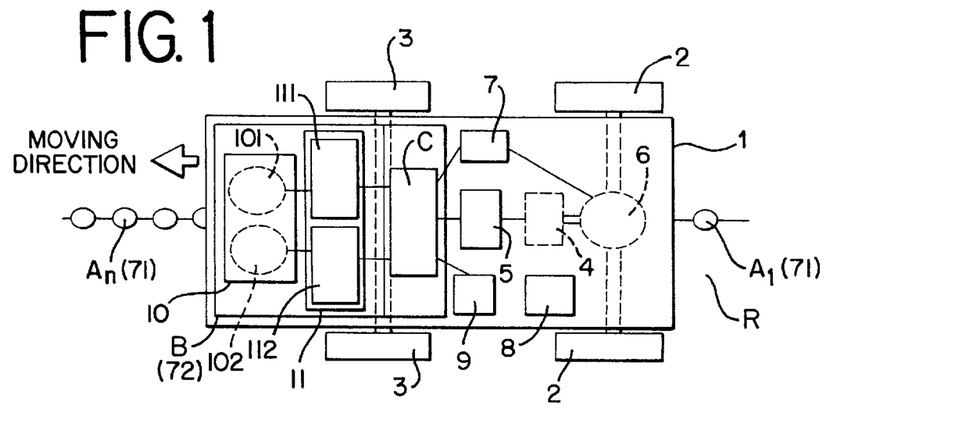
FIG. 1 is a summarized plane view showing an autonomous vehicle equipped with a first preferred embodiment of a navigating device according the present invention.
Figure 2:
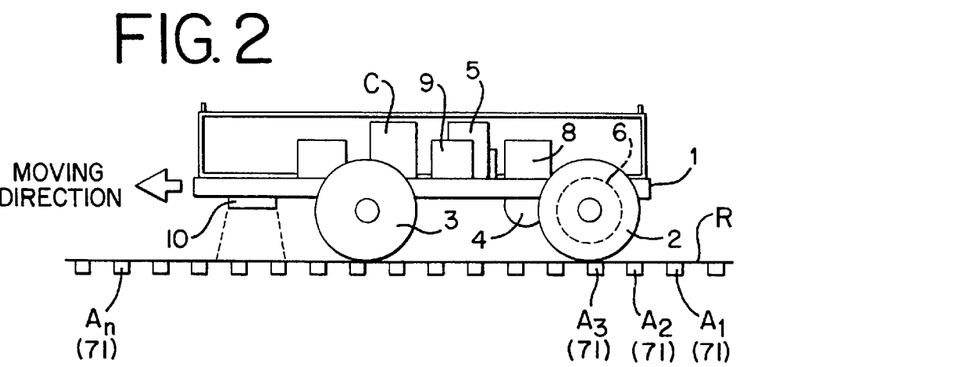
FIG. 2 is a side view of the autonomous vehicle shown in FIG. 1.

The present invention will be described below in reference with drawings showing preferred embodiments. FIGS. 1, 2 are plane view and cross-sectional side view respectively, showing an autonomous vehicle according to the present invention. In FIGS. 1, 2, numerals A1, A2, A3, . . . An, . . . indicate route beacons that are placed at regular intervals along indoor or outdoor passageways leading to a destination. The route beacons are adhered onto a surface R of the passageway or laid underground. These route beacons A1, A2, A3, . . . . An, . . . are constructed in a similar manner that the information storing element 71 of the RFID, as described in reference with FIG. 7, is constructed. Each beacon is provided with an integrated circuit comprising: a memory 711; a power circuit 712; a transmitting/receiving circuit 11a (control circuit 713 and modular circuit 714); and an antenna coil 715. Also, the memory 711 of each of the beacons A1, A2, A3 . . . An, . . . stores its own location information (location data) indicating its position (on the route).

In FIGS. 1, 2, a numeral 1 indicates a carriage mounted with driving wheels 2, driven wheels 3, a motor 4 for driving the driving wheels, a motor drive 5 for controlling the motor 4, a steering mechanism 6 for controlling the moving direction of the carriage 1, a controller 7 for controlling the steering mechanism 6, and a power source 8.

In addition, the carriage 1 is further equipped with: a carriage navigating device B; a computer C; and a radio communications unit 9 for communicating with a host computer, that is not mounted on the carriage 1. The computer C stores information indicating locations of the route beacons on the route to the destination. The carriage navigating device B corresponds to the information retrieving section 72 of the RFID, that was described in reference with FIG. 7. The carriage navigating device B comprises an antenna section 10 and a transmitting/receiving circuit 11. The antenna section 10 consists of two SW antenna coils (antennas) 101, 102 that are placed adjacent to each other and positioned left and right in the moving direction of the carriage 1. The transmitting/receiving circuit 11 consists of two mobile transmitting/receiving circuits 111, 112 connected respectively to the SW antennas 101, 102.

As the carriage 1 travels along the route on the passageway, the antenna section 10 (the SW antenna coils 101, 102) comes in proximity to an antenna coil 715 of each of the route beacons A1, A2, A3, . . . An, . . . in sequence. At each encounter, radio waves are transmitted and received between the microwave antenna coils 101, 102 and the antenna coil 715, thereby supplying electricity from the carriage navigating device B to each route beacon An (71) in sequence, and the mobile transmitting/receiving circuits 111, 112 retrieve location information stored in the memory 711 of the route beacon An (71), i.e., the present position information of the carriage 1 (mobile unit). The computer C then executes computation, including comparing this retrieved location information with its own location information indicating locations of the route beacons and uses a computation result to control the motor drive 5, the motor 4, the controller 7, and the steering mechanism 6, thereby enabling the carriage 1 to track the route formed with the route beacons A1, A2, A3, An, along the passageway, thereby autonomously navigating the carriage 1 to the destination. The power source 8 is for providing electricity to various components and devices including the motor 4, the carriage navigating device B, the computer C and the radio communications unit 9, as well as providing electricity to each route beacon An via the antenna coils 101, 102, (723), 715.

Figure 3:
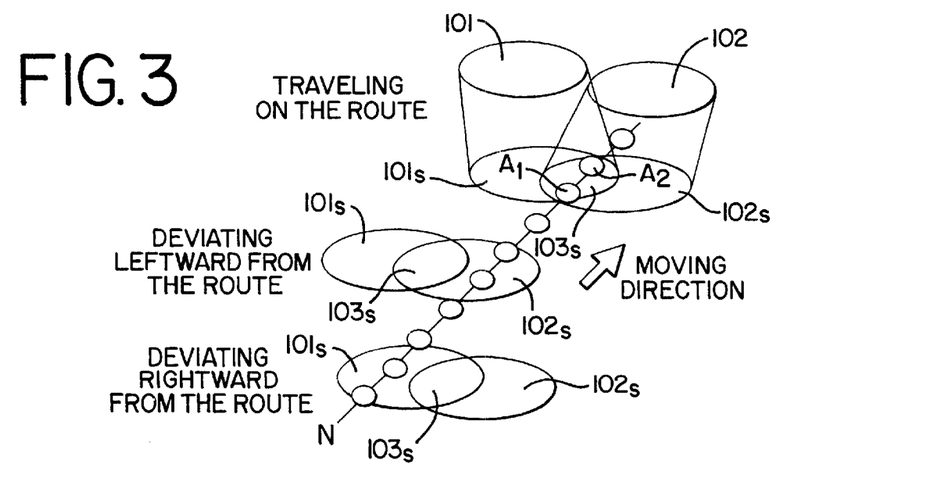
FIG. 3 is a diagram explaining the navigating procedures operated by the navigating device of the autonomous vehicle shown in FIGS. 1, 2.

FIG. 3 shows the process in which the antenna coils 101, 102 of the antenna section 10 mounted on the carriage 1 retrieve the location information stored in the memory 711 of a route beacon An (71) via its antenna coil 715. In this process, each of the antenna coils 101, 102 of the antenna section 10 is capable of retrieving information within a limited range defined by its sensitivity. For example, they can retrieve location information stored in route beacons A1 and A2 within their combined information-retrievable ranges (i.e., the radio wave receivable ranges) 10s, 102s, as shown in FIG. 3. The antenna coils 101, 102 are closely placed side by side with a small distance therebetween so that the information-retrievable range of the antenna section 10 consists of the information-retrievable ranges 101s and 102s separately covered by the antenna coils 101 and 102, respectively, and an over-wrapped information-retrievable range 103s covered by both antenna coils 101, 102. Apparently, location information of other route beacons, that are located outside these information-retrievable ranges 10s, 102s and 103s, cannot be retrieved by the antenna section 10.

The route beacons A1, A2, A3, . . . An, . . . are placed at respective locations on the route along the passageway to the destination. When a route beacon An receives a radio wave transmitted from the antenna coils 101, 102 of the carriage navigation device B mounted on the carriage 1, a power source circuit 712 of the route beacon An converts the radio wave into electricity. The electricity activates a control circuit 713 that reads out the location information of the route beacon An stored in the memory 711 and transmits the location information from an antenna coil 715 in the form of radio wave toward the carriage navigating device B. If the transmitted radio wave is detected in the radio wave receivable ranges (the information-retrievable ranges) of the antenna coils 101, 102 of the carriage navigating device B, the location information of the route beacon An is retrieved by the antenna coils 101, 102. This location information is then computed by the computer C and the computation result is used to correctly navigate the carriage 1 to the destination.

When the carriage 1 is passing directly above a beacon line N on which the route beacons A1, A2, A3, . . . An . . . are placed, each route beacon An should come in the over-wrapped information retrievable range 103s covered by both antenna coils 101, 102 so that both antenna coils 101, 102 simultaneously read the location information of the same route beacon An.

When the moving direction of the carriage 1 runs off leftward from the beacon line N on which the route beacons A1, A2, A3, . . . An . . . are placed, the route beacon An comes into the information retrievable range 102s covered only by the antenna coil 102, and thus the location information of the route beacon An is retrieved only by the antenna coil 102.

On the other hand, when the moving direction of the carriage 1 runs off rightward from the beacon line N on which the route beacons A1, A2, A3 . . . An . . . are placed, the route beacon An comes into the information retrievable range 101s covered only by the antenna coil 101, and thus the location information of the route beacon An is retrieved only by the antenna coil 101.

Thus, a deviation of the traveling direction of the carriage 1 from a designated route can be detected based on the information retrievable range in which the beacon location information is retrieved. The controller 7 controls the steering mechanism 6 to steer the carriage 1 back to the correct course in order to correctly and autonomously guide the carriage 1 to the destination. The location information of the destination and information indicating the locations of all route beacons on a route to the destination may be stored in advance in the computer C mounted on the carriage 1. As the carriage 1 travels, the location information of each of the route beacons A1, A2, A3, . . . An, . . . , is read out and compared with the computer C's information indicating locations of the route beacons in sequence, thereby enabling the carriage 1 to track a line of the route beacons and thus autonomously navigating itself to the destination.

In the preferred embodiment described above, since the two antenna coils 101, 102 are placed adjacent to each other, one receives radio wave transmitted from the other. Therefore, the antenna coils 101, 102 may not be able to correctly read the location information of a route beacon An because of disturbance of the adjacent electric fields caused by the radio waves interfering with each other. This problem can be solved by assigning different oscillation frequencies to the antenna coils. The interference between the radio waves may also be prevented by operating the mobile transmitting/receiving circuits 111, 112 on a time-share basis to prohibit a simultaneous operation of the mobile transmitting/receiving circuits 111, 112.

Figure 4:
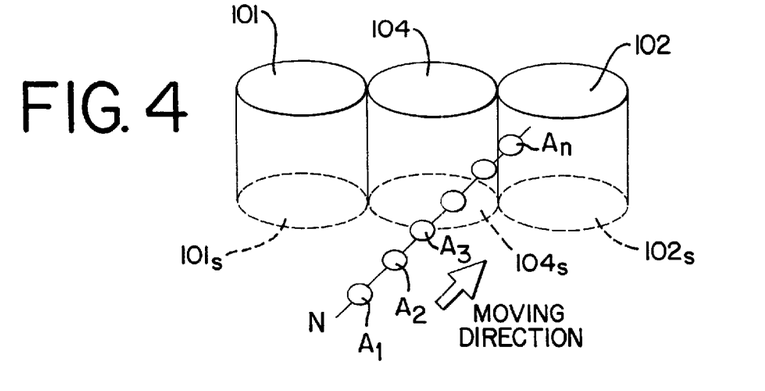
FIG. 4 is a diagram explaining the navigating procedures operated by a navigating device according to a second preferred embodiment of the present invention.

FIG. 4 shows a carriage navigating section of the navigating device for an autonomous vehicle according to a second preferred embodiment of the present invention. In this embodiment, the carriage navigating device B shown in FIGS. 1 through 3 is provided with, in addition to the antenna coils 101, 102 and the mobile transmitting/receiving circuits 111, 112, a third antenna coil 104 located between the antenna coils 101, 102 and a third mobile transmitting/receiving circuit (not shown in the drawing) connected to the third antenna coil 104. Therefore, as shown in FIG. 4, the antenna coils 101, 102, 104 have their respective information retrievable ranges (radio wave receivable ranges) 101s, 102s, 104s. Therefore, when the carriage 1 is traveling directly above the route beacon line N on which the route beacons A1, A2, A3, . . . An, . . . are placed, the location information of a route beacon An is retrieved by the additional center antenna coil 104. If the moving direction of the carriage 1 runs off leftward from the route beacon line N on which the route beacons A1, A2, A3, . . . An, . . . are placed, the location information of a route beacon An is retrieved by the antenna coil 102 located on the right side in the moving direction of the carriage. On the other hand, if the moving direction of the carriage 1 runs off rightward from the route beacon line N on which the route beacons A1, A2, A3, . . . An, . . . are placed, the location information of a route beacon An is retrieved by the antenna coil 101 on the left side in the moving direction of the carriage. Therefore, depending on which of the three antenna coils 101, 102, 104 retrieve the location information of the route beacon An, a deviation of the carriage 1 from the designated route can be detected. Accordingly, the controller 7 controls the steering mechanism 6 to steers the carriage 1 back to the correct course and thus correctly and autonomously navigate the carriage 1 to the destination.

Figure 5:
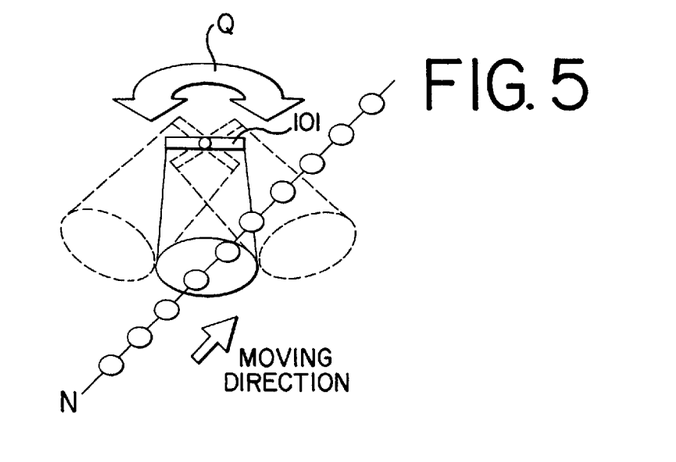
FIG. 5 is a diagram explaining the navigating procedures operated by a navigating device according to a third preferred embodiment of the present invention.

FIG. 5 shows a carriage navigating section of the navigating device for an autonomous vehicle according to a third preferred embodiment of the present invention. The carriage navigating device B shown in FIGS. 1 through 3 is provided with a single antenna coil 101 and a transmitter/receiver (not shown in the drawing) connected to the antenna. As shown by an arrow Q, the antenna coil 101 rotates to the right and left in the moving direction of the carriage 1 to retrieve the location information of route beacons A1, A2, A3, . . . An . . . that form a route beacon line N. Therefore, when the moving direction of the carriage 1 runs off rightward or leftward from the route beacon line N on which the route beacons A1, A2, A3, . . . An . . . are placed, the location information of a route beacon An is retrieved by the antenna coil 101 when it rotates to the left, or to the right. The deviation of the carriage 1 from the designated route is thus detected. The controller 7 operates the steering mechanism 6 to steer the carriage back to the correct course to correctly and autonomously navigate the carriage 1 to the destination.

Figure 6:
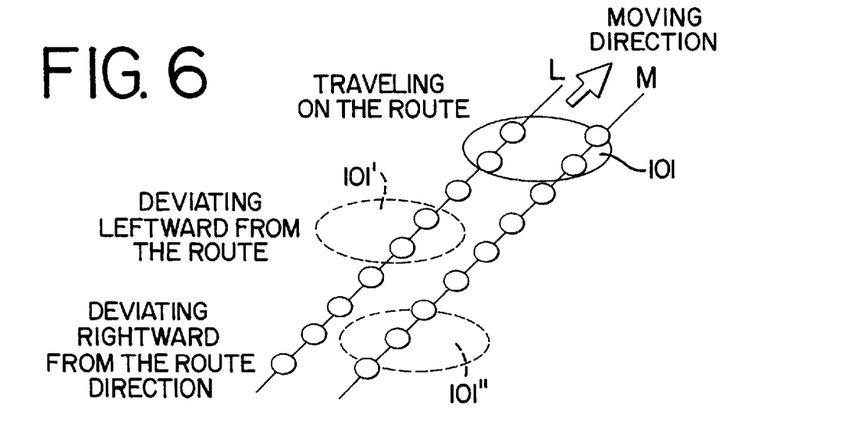
FIG. 6 is a diagram explaining the navigating procedures operated by a navigating device according to a forth preferred embodiment of the present invention.

FIG. 6 shows a carriage navigating section of the navigating device for an autonomous vehicle according to a forth preferred embodiment of the present invention. In this embodiment, more than one beacon line formed with route beacons A1, A2, A3, . . . An, . . . , each beacon storing its own location information, are placed in parallel with each other (in FIG. 6, two lines L, M are shown) along a passageway. A single antenna coil 101 retrieves the location information simultaneously from the two lines of route beacons A1, A2, A3 . . . . An . . . . When the carriage 1 is traveling, tracing both route beacon lines L, M of the route beacons A1, A2, A3, . . . An . . . , the antenna coil 101 retrieves the location information of route beacons from both beacon lines L, M. However, when the moving direction of the carriage 1 runs off the route beacon lines L, M of the route beacons A1, A2, A3, . . . . An . . . , the antenna coil 101 moves to the place shown by numerals 101', 101" in FIG. 6, and fails to retrieve the location information from either beacon lines L or M.

Therefore, based on the number of beacon lines from which the antenna coil 101 can retrieve the location information, a deviation of the carriage 1 from the passageway route can be detected. The deviation can be corrected by the controller 7 controlling the direction navigating mechanism 6 to steer the carriage 1 back to the correct course and thus correctly and autonomously navigate the carriage 1 to the destination.

As it is clear from the preferred embodiments described above, according to the navigating method for an autonomous vehicle, the navigating device and an autonomous vehicle with the navigating device of the present invention, various merits are obtained. For example, this navigating method doesn't involve complex image processing or image analysis technologies and doesn't require fixed navigating cables or tracks to be laid down throughout the passageways. Therefore, the cost for building infrastructures can be substantially reduced. Moreover, because the present invention doesn't use component materials that deteriorate quickly over years, such as tapes, it is possible to maintain a highly reliable autonomous navigation operation for a long time. In addition, by using the concept of the RFID in route beacons, circuits for retrieving beacon location information are automatically activated only when the vehicle is traveling by. Therefore, an energy loss in the navigation facility during stand-by periods can be significantly reduced.

While the invention has been described in terms of preferred embodiment, those skilled in the art will recognize that the invention can be practiced with modifications within the spirit and scope of the appended claims.

What is claimed is:

1. A navigating method for an autonomous vehicle, comprising the steps of:

providing a route for the vehicle, formed with a plurality of information storing elements in line along passageways on which the vehicle travels, each of said information storing elements storing in advance its own location information on the route, mounting an information retrieving section on the vehicle so that as the vehicle travels, said information retrieving section will come sufficiently close to said plurality of information storing elements in sequence;

transmitting radio waves between said information retrieving section and an information storing element;

supplying, through transmission of the radio wave, electricity from the vehicle to said information storing element placed along the route to activate said information storing element;

retrieving, by said information retrieving section of the vehicle, the location information stored in said information storing element that indicates the present position of the vehicle; and controlling a moving direction of the vehicle based on said position information to guide the vehicle along the route to a destination.

2. A navigating method for navigating an autonomous vehicle, the method comprising the steps of:

providing a beacon line formed with a plurality of route beacons placed in line along passageways, each beacon comprising: a memory storing its own location information on the route of a vehicle; an antenna for transmitting and receiving radio waves; a power circuit for converting a radio wave received by said antenna and supplying it as electricity; and a transmitting/receiving circuit, including said antenna, for receiving a radio wave, retrieving, powered by said power circuit, said beacon location information from said memory and transmitting said beacon location information by said antenna in the form of radio wave, said beacons being placed at specific locations corresponding to their respective location information, on said vehicle having driving wheels and steering means for controlling its moving direction, mounting: a transmitting/receiving circuit, including an antenna for transmitting transmitting/receiving radio waves, for transmitting a radio wave toward said route beacon and for receiving a radio wave containing the location information thereof, thus obtaining the present position information of the vehicle therefrom; and a power source for operating said transmitting/receiving circuit, said driving wheels and said steering means for controlling a moving direction of the vehicle, providing the vehicle further with a computer, in which information indicating locations of said route beacons to a destination is stored in advance, for executing computation, including comparing said retrieved vehicle's position information with said information indicating locations of the route beacons;

controlling said steering means to control the moving direction based on a computation result;

supplying, through transmission of the radio wave from said transmitting/receiving circuit of the vehicle, electricity from said vehicle to said beacons in sequence as the vehicle travels autonomously, thereby retrieving the stored location information from the memory of said route beacon;

transmitting a radio wave containing said location information to the transmitting/receiving circuit of the vehicle in sequence;

receiving, by said transmitting/receiving circuit of the vehicle, said radio wave containing the location information and obtaining the vehicle's present position information therefrom;

executing computation, by said computer, including comparing the vehicle's present position information with said information indicating the locations of the route beacons; and controlling a moving direction of the vehicle based on said computation result to track the line of said route beacons, thereby guiding the autonomous vehicle along the route to the destination.

3. A navigating method for an autonomous vehicle recited in claim 2, wherein the vehicle has a single mobile transmitting/receiving circuit, including an antenna for receiving a radio wave from a route beacon, and said antenna is rotated to the right and left in the moving direction of the vehicle, thereby detecting said radio wave from said route beacon.

4. A navigating method for an autonomous vehicle recited in claim 2, wherein there are two lines, each formed with the beacons, placed in parallel with each other, said vehicle has a single mobile transmitting/receiving circuit, including an antenna for receiving a radio wave from a route beacon, and based on a phase of said single transmitting/receiving circuit in which said radio wave from a route beacon is received, the vehicle's present position and its moving direction are detected.

5. A navigating method for navigating an autonomous vehicle, the method comprising the steps of:

providing a beacon line formed with a plurality of route beacons placed in line along passageways, each beacon comprising: a memory storing its own location information on the route of a vehicle; an antenna for transmitting and receiving radio waves; a power circuit for converting a radio wave received by said antenna and supplying it as electricity; and a transmitting/receiving circuit, including said antenna, for receiving a radio wave, retrieving, powered by said power circuit, said beacon location information from said memory and transmitting said beacon location information by said antenna in the form of radio wave, said beacons being placed at specific locations corresponding to their respective location information, on said vehicle having driving wheels and steering means for controlling its moving direction, mounting: a transmitting/receiving circuit, including an antenna for transmitting transmitting/receiving radio waves, for transmitting a radio wave toward said route beacon and for receiving a radio wave containing the location information thereof, thus obtaining the present position information of the vehicle therefrom; and a power source for operating said transmitting/receiving circuit, said driving wheels and said steering means for controlling a moving direction of the vehicle, providing the vehicle further with a computer, in which information indicating locations of said route beacons to a destination is stored in advance, for executing computation, including comparing said retrieved vehicle's position information with said information indicating locations of the route beacons;

controlling said steering means to control the moving direction based on a computation result;

supplying, through transmission of the radio wave from said transmitting/receiving circuit of the vehicle, electricity from said vehicle to said beacons in sequence as the vehicle travels autonomously, thereby retrieving the stored location information from the memory of said route beacon;

transmitting a radio wave containing said location information to the transmitting/receiving circuit of the vehicle in sequence;

receiving, by said transmitting/receiving circuit of the vehicle, said radio wave containing the location information and obtaining the vehicle's present position information therefrom;

executing computation, by said computer, including comparing the vehicle's present position information with said information indicating the locations of the route beacons; and controlling a moving direction of the vehicle based on said computation result to track the line of said route beacons, thereby guiding the autonomous vehicle along the route to the destination, wherein there are a plurality of transmitting/receiving circuits, each circuit including an antenna for receiving a radio wave from a route beacon, and based on phases of respective said transmitting/receiving circuits, in which said radio wave from a route beacon is received, said vehicle's present position and its moving direction are detected.

6. A navigating method for an autonomous vehicle recited in claim 5, wherein there is a single line formed with route beacons, the vehicle has two transmitting/receiving circuits, each circuit including an antenna for receiving a radio wave from a route beacon, and, based on phases of said two transmitting/receiving circuits, in which said radio wave from each route beacon is received, said vehicle's present position and its moving direction are detected.

7. A navigating method for an autonomous vehicle recited in claim 5, wherein different oscillation frequencies are assigned to said plurality of transmitting/receiving circuits respectively, each circuit including an antenna for receiving a radio wave from a route beacon, so that radio wave interference between said plurality of transmitting/receiving circuits is prevented.

8. A navigating method for an autonomous vehicle recited in claim 5, wherein said plurality of transmitting/receiving circuits are operated on a time-share basis to prohibit a simultaneous operation of said transmitting/receiving circuits, so that radio wave interference between said plurality of transmitting/receiving circuits is prevented.

9. A navigating device for an autonomous vehicle, comprising:

a plurality of route beacons, each beacon having: a memory storing its own location information in reference to a route of the vehicle; an antenna for transmitting and receiving radio waves; a power circuit for converting said radio wave received by said antenna and supplying it as electricity; and a transmitting/receiving circuit, including an antenna, for receiving a radio wave, retrieving, powered by said power circuit, said beacon location information from said memory, and transmitting said beacon location information by said antenna in the form of radio wave;

a route beacon line formed with said route beacons placed at specific locations corresponding to their respective location information;

a vehicle having driving wheels and steering means for controlling its moving direction;

a mobile transmitting/receiving circuit, including a radio wave transmitting/receiving antenna, for transmitting and receiving radio waves toward and from said route beacons and retrieving said beacon location information so as to obtain vehicle's present position information therefrom;

a power source for operating said mobile transmitting/receiving circuit, said driving wheels and said steering means; and a computer, in which information indicating locations of the beacons to a destination is stored, for executing computation, including comparing said obtained vehicle's position information with said information indicating locations of the route beacons, thereby controlling a moving direction of said steering means, said navigating device for the autonomous vehicle wherein said mobile transmitting/receiving circuit and said power source are mounted thereon.

10. A navigating device for an autonomous vehicle recited in claim 9, wherein there is a single mobile transmitting/receiving circuit on which an antenna is supported in such a manner that it rotates to the right and left in the moving direction of the vehicle.

11. A navigating device for an autonomous vehicle recited in claim 9, wherein there are two beacon lines placed in parallel with each other, each line formed with said route beacons, and there is a single mobile transmitting/receiving circuit.

12. A navigating device for an autonomous vehicle, comprising:

a plurality of route beacons, each beacon having: a memory storing its own location information in reference to a route of the vehicle; an antenna for transmitting and receiving radio waves; a power circuit for converting said radio wave received by said antenna and supplying it as electricity; and a transmitting/receiving circuit, including an antenna, for receiving a radio wave, retrieving, powered by said power circuit, said beacon location information from said memory, and transmitting said beacon location information by said antenna in the form of radio wave;

a route beacon line formed with said route beacons placed at specific locations corresponding to their respective location information;

a vehicle having driving wheels and steering means for controlling its moving direction;

a mobile transmitting/receiving circuit, including a radio wave transmitting/receiving antenna, for transmitting and receiving radio waves toward and from said route beacons and retrieving said beacon location information so as to obtain vehicle's present position information therefrom;

a power source for operating said mobile transmitting/receiving circuit, said driving wheels and said steering means; and a computer, in which information indicating locations of the beacons to a destination is stored, for executing computation, including comparing said obtained vehicle's position information with said information indicating locations of the route beacons, thereby controlling a moving direction of said steering means, said navigating device for the autonomous vehicle wherein said mobile transmitting/receiving circuit and said power source are mounted thereon, wherein there are a plurality of mobile transmitting/receiving circuits.

13. A navigating device for an autonomous vehicle recited in claim 12, wherein there is a single beacon line formed with said route beacons; and there are two mobile transmitting/receiving circuits.

14. A navigating device recited in claim 12, wherein different oscillation frequencies are assigned to said plurality of mobile transmitting/receiving circuits respectively.

15. A navigating device recited in claim 12, wherein said plurality of transmitting/receiving circuits are operated on a time-share basis to prohibit a simultaneous operation of said transmitting/receiving circuits.

16. An autonomous vehicle having a navigating device comprising:

a mobile transmitting/receiving circuit for transmitting a radio wave toward a plurality of route beacons, each route beacon comprising: a memory storing location information indicating its own location on a passageway; an antenna for transmitting and receiving radio waves; a power circuit for converting the radio wave received by said antenna into electricity and supplying it as electricity; and a transmitting/receiving circuit for receiving a radio wave and retrieving, powered by said power circuit, said location information from said memory and transmitting it by said antenna in the form of radio wave, said mobile transmitting/receiving circuit for receiving said radio wave from said route beacon and obtaining the vehicle's present position information therefrom;

a power source required for operating said mobile transmitting/receiving circuit, driving wheels and steering means of the vehicle for controlling a moving direction of the vehicle; and a computer, in which information indicating locations of said route beacons on the passageway to a destination is stored, for executing computation, including comparing said vehicle's present position information with said information indicating locations of the route beacons, thereby controlling said steering means.

17. An autonomous vehicle provided with a navigating device recited in claim 16, wherein said navigating device is provided with a single mobile transmitting/receiving circuit, and an antenna of said mobile transmitting/receiving circuit is supported in such a manner that said antenna rotates to the right and left in the moving direction of the vehicle.

18. An autonomous vehicle having a navigating device comprising:

a mobile transmitting/receiving circuit for transmitting a radio wave toward a plurality of route beacons, each route beacon comprising: a memory storing location information indicating its own location on a passageway; an antenna for transmitting and receiving radio waves; a power circuit for converting the radio wave received by said antenna into electricity and supplying it as electricity; and a transmitting/receiving circuit for receiving a radio wave and retrieving, powered by said power circuit, said location information from said memory and transmitting it by said antenna in the form of radio wave, said mobile transmitting/receiving circuit for receiving said radio wave from said route beacon and obtaining the vehicle's present position information therefrom;

a power source required for operating said mobile transmitting/receiving circuit, driving wheels and steering means of the vehicle for controlling a moving direction of the vehicle; and a computer, in which information indicating locations of said route beacons on the passageway to a destination is stored, for executing computation, including com paring said vehicle's present position information with said information indicating locations of the route beacons, thereby controlling said steering means, wherein said navigating device is provided with a plurality of said mobile transmitting/receiving circuits.

19. An autonomous vehicle provided with a navigating device recited in claim 18, wherein different oscillation frequencies are assigned to said plurality of mobile transmitting/receiving circuits respectively.

20. An autonomous vehicle provided with a navigating device recited in claim 18, wherein said plurality of transmitting/receiving circuits are operated on a time-share basis to prohibit a simultaneous operation of said transmitting/receiving circuits.

* * * * *